United States Patent [19]

Thistlethwaite et al.

[11] Patent Number: 4,729,982

[45] Date of Patent: Mar. 8, 1988

[54] BED PACKING MATERIAL

[75] Inventors: Terence Thistlethwaite, Middlesbrough; Johan H. H. T. Maat, Stockton-on-Tees; Peter J. Davidson, Darlington, all of England

[73] Assignee: Imperial Chemical Industries PLC, London, England

[21] Appl. No.: 924,037

[22] Filed: Oct. 28, 1986

[30] Foreign Application Priority Data

Nov. 8, 1985 [GB] United Kingdom ............... 8527663
Jun. 12, 1986 [GB] United Kingdom ............... 8614297

[51] Int. Cl.$^4$ ........................ B01J 23/74; B01J 35/04
[52] U.S. Cl. ........................... 502/338; 502/439; 502/527
[58] Field of Search ............... 502/258, 338, 316, 439, 502/527

[56] References Cited

U.S. PATENT DOCUMENTS

| | | | |
|---|---|---|---|
| 2,408,164 | 9/1946 | Foster | 502/527 X |
| 2,992,191 | 7/1961 | Erickson | 502/328 X |
| 3,243,386 | 3/1966 | Nielsen et al. | 502/328 X |
| 3,403,112 | 9/1968 | Sze et al. | 502/316 |
| 3,644,216 | 2/1972 | Epolon et al. | 502/328 X |
| 3,755,199 | 8/1973 | Stepanescu et al. | 502/328 X |
| 3,846,341 | 11/1974 | Courty | 502/316 |
| 3,855,153 | 12/1974 | Chang | 502/316 |
| 3,891,575 | 6/1975 | Brautigan et al. | 502/527 X |
| 3,975,302 | 8/1976 | Courty et al. | 502/316 X |
| 4,042,738 | 8/1977 | Gulati | 502/439 X |
| 4,089,941 | 5/1978 | Villemin | 423/654 |
| 4,233,187 | 11/1980 | Atwood et al. | 423/653 |
| 4,261,862 | 4/1981 | Kinoshita et al. | 502/524 X |
| 4,402,870 | 9/1983 | Schurwan | 502/429 |
| 4,420,421 | 12/1983 | Cananese et al. | 502/316 |
| 4,456,703 | 6/1984 | Aldridge | 502/524 X |
| 4,471,070 | 9/1984 | Siefert et al. | 502/524 X |
| 4,510,261 | 4/1985 | Pereira et al. | 502/730.4 |
| 4,510,262 | 4/1985 | Kim et al. | 502/527 X |
| 4,510,263 | 4/1985 | Pereno et al. | 502/527 X |
| 4,521,532 | 6/1985 | Cho | 502/439 |
| 4,618,597 | 10/1986 | Fioto et al. | 502/328 X |

FOREIGN PATENT DOCUMENTS

| | | | |
|---|---|---|---|
| 52-7391 | 1/1977 | Japan | 502/338 |
| 56-48249 | 1/1981 | Japan | 502/258 |
| 2057905 | 9/1980 | United Kingdom . | |
| 627850 | 10/1978 | U.S.S.R. | 502/338 |
| 430575 | 5/1979 | U.S.S.R. | 502/338 |

*Primary Examiner*—W. J. Shine
*Attorney, Agent, or Firm*—Cushman, Darby & Cushman

[57] ABSTRACT

A bed packing material, e.g. for use as a catalyst precursor, in the form of regular, preferably cylindrical, units having a multiplicity of through passages of small cross section so that the units have a low voidage, GV, a high ratio of the geometric surface area, GSA, to the volume V, of the equivalent cylindrical unit having no passages, and a high ratio of GSA to the product of GV and the surface area, A, of the equivalent cylindrical unit having no passages.

10 Claims, No Drawings

BED PACKING MATERIAL

This invention relates to bed packing materials, i.e. solid units which may be packed to form a bed: such beds are widely used as distillation column packings, as catalysts, as absorbents, and as adsorbents. The units of the present invention have a regular shape, as opposed to irregular shapes made by crushing or grinding.

The effectiveness of a bed packing material is related to the ratio of the geometric surface area, GSA, of the unit of the volume it occupies, i.e. in the case of a unit of cylindrical external configuration, the volume, V, of the cylinder of length equal to the length, L, of the unit and diameter, D, equal to the diameter of the unit. In order to increase this effectiveness, the ratio GSA/V is desirably increased.

This of course may be achieved by increasing GSA and/or decreasing V whilst maintaining the same geometric shape. However decreasing V, i.e. by making the unit smaller, has the disadvantage of increasing the resistance of flow of fluid through a bed of the units, resulting in an increased pressure difference between the fluid entering and leaving the bed. It is therefore desirable, for any given application, to increase the GSA of the units, while leaving V unchanged, although, as described below, it may be possible to reduce V somewhat and not obtain a significant increase in this pressure drop. The increase in GSA, while leaving V unchanged, may be achieved by providing one or more passages extending through the unit.

There have been numerous proposals for such units. In the simplest form, units in the form of cylinders with a single concentric cylindrical passage have been widely used as supports for catalysts and for other bed packing applications.

Units with a plurality of through cylindrical passages have been disclosed in, for example, GB-A-2057905 and DE-A-2425058. Units of cylindrical external configuration with a plurality of passages of non-cylindrical configuration have been proposed in, inter alia, U.S. Pat. No. 4089941, U.S. Pat. No. 4233187, and U.S. Pat. No. 4510261. In the latter references, the units had passages of "pie sector", or square, cross section.

The number, size, and shape of the passages, relative to the external dimensions of the unit, affects the degree by which the GSA is increased, i.e. affects the value of the ratio GSA/A, where A is the geometric surface area of the unit before provision of the passages; i.e., in the case of units of cylindrical external configuration of length L and diameter D, A is the surface area of the solid cylinder of length L and diameter D.

The provision of passages in order to increase the ratio GSA/V by a significant amount has heretofore resulted in the units having a significant geometric voidage, GV, which may be considered to be the ratio of the total volume of the through passages to V. However it is often desirable to provide as much solid material as possible in the unit, particularly where the material is a catalyst or an adsorbent, or absorbent. Also, the lower the geometric voidage, the greater will be the strength of the unit in its resistance to crushing. In the previous proposals, the provision of passages to provide for the ratio GSA/A to be increased sufficiently so that GSA/V is high, has resulted in GV being unacceptably high for many applications.

In the present invention these disadvantages are overcome by providing the unit with a relatively large number of passages, in relation to the cross sectional area of the unit, with these passages each having a relatively small cross section.

Accordingly the present invention provides a bed packing material in the form of units, each unit having
(a) a substantially uniform cross section;
(b) a length, L, to notional cross section diameter, D, ratio of at least 0.5, the minimum of said length and notional cross section diameter being at least 3 mm; and
(c) a multiplicity of passages of substantially uniform cross section extending lengthwise through the unit said passages having an effective diameter of 0.03 to 1 mm, and there being at least 20 passages per $cm^2$ of the unit cross section area;
the number of said passages, and their size relative to said length, L, and notional cross section diameter, D, being such that each unit has
(i) a geometric voidage, GV, of not more than 0.40;
(ii) a ratio of the geometric surface area, GSA, to the volume, V, of the cylinder of length L and diameter D, of at least 10 $cm^{-1}$; and
(iii) a ratio of GSA to the product of GV and A of at least 15, where A is the surface area of the cylinder of length L and diameter D.

The units preferably have the external form of a cylinder or prism of regular polygonal, e.g. hexagonal, cross section.

The notional cross section diameter of the unit is herein defined as the diameter, D, of the circle of area equal to the cross sectional area the unit would have it there were no passages therethrough. For a unit of cylindrical configuration, D is, of course, equal to the external diameter of the unit.

The passages have a notional diameter, d, likewise defined as the diameter of the circle of area equal to the cross sectional area of each passage.

The passages preferably have a circular cross section, although other cross sections may be used. The effective diameter, $d_e$, of the passage is herein defined as four times the cross sectional area of the passage divided by the perimeter of the passage cross section. [In the case of passages of circular cross section, the effective diameter, $d_e$, is thus the diameter of the passage cross section while for passages having a cross section in the form of a regular polygon, the effective diameter, $d_e$, is the diameter of the inscribed circle. Note that only in the case of passages of circular cross section are the effective and notional passage diameters the same and equal to the actual passage diameter].

The ratio of the length to the notional diameter i.e. the aspect ratio, of the units is at least 0.5 and preferably is in the range 0.5 to 3, more preferably 0.5 to 2, and particularly 0.75 to 1.5.

The geometric surface area, GSA, of units of length L and notional diameter D having a number n of passages of notional diameter d is given by $$GSA = \pi[2L(D_1 + nd_1) + D^2 - nd^2]/2$$

where $D_1$ and $d_1$ are the diameters of the circles having perimeters equal to the perimeter of the unit and passage cross section respectively. [Where the unit is of circular cross section, $D_1$ of course equals D. Likewise where the passages are of circular cross section $d_1$ equals d].

The volume, V, is given by $$V = \pi D^2 L/4$$

Hence $$GSA/V = 4[(D_1 + nd_1) + (D^2 - nd^2)/2L]/D^2$$

The geometric voidage, GV, equals 1−(actual volume)/V and so $$GV = nd^2/D^2$$

The number, N, of passages per unit cross section area of the unit is given by $$N = 4n/\pi D^2$$

The geometric surface area, GSA, relative to the area, A, of the cylinder of length L and diameter D, is given by $$GSA/A = [2L(D_1 + nd_1) + D^2 - nd^2]/[2LD_1 + D^2]$$

and so the ratio $GSA/(A \cdot GV)$ is given by $$GSA/(A \cdot GV) = D^2[2L(D_1 + nd_1) + D^2 - nd^2]/[nd^2(2LD_1 + D^2)]$$

In the present invention, the number, n, and the size and shape, i.e. d and $d_1$, of the passages, relative to the exterior dimensions, L, D, and $D_1$, of the units are chosen such that:

L and D are both at least 3, and are preferably below 20, and in particular are both in the range 6 to 15, mm;

$d_e$ is 0.03 to 1, preferably at least 0.05, particularly 0.2 to 0.5, mm;

N is at least 20, and preferably is in the range 25 to 5000, $cm^{-2}$, particularly 25 to 2,000 $cm^2$;

GSA/V is at least 10, and is preferably at least 15, particularly at least 20, $cm^{-1}$;

GV is less than 0.40, and preferably less than 0.35, particularly less than 0.2; and $GSA/(A \cdot GV)$ is at least 15, and in particular is at least 20.

Examples of GSA/V, GV, GSA/(GV·A), and N, for units of cylindrical external configuration having cylindrical passages (so that $D_1 = D$, and $d_1 = d_e = d$) having various values of L, D, d, and n, are shown in the following table. [L, D, and d, are all expressed in mm]. Also shown in the table are representative units of prior proposals: in the case of units (c) and (d), the value quoted in parenthesis is $d_1$. The table also indicates by an asterisk (*) the parameters of these prior proposals that do not satisfy the requirements of the the present invention.

In the table the prior units are
(a) the example of DE-A-2425058;
(b) that unit tabulated in GB-A-2057905 having the largest number of passages;
(c) a typical unit according to the preferments at column 3 lines 26 to 57 of U.S. Pat. No. 4510261, viz a six-vaned hollow cylinder of outside diameter 3.18 mm, length 4.77 mm (so that the aspect ratio is 1.5, i.e. in the middle of the preferred range), vane thickness 0.35 mm (0.11D, i.e. in the middle of the preferred range of 0.07 to 0.15D), wall thickness 0.56 mm (0.175D, i.e. in the middle of the preferred range 0.15 to 0.2D), with no discrete hub. In this case $d_e$ is 0.46 mm.
(d) support A of U.S. Pat. No. 4089941. In this case $d_e$ is 4.55 mm.

|     | D(mm) | L(mm) | d(mm)       | n    | N ($cm^{-2}$) | GSA/V ($cm^{-1}$) | GV   | GSA/A · GV |
| --- | ----- | ----- | ----------- | ---- | ----- | ---------- | ---- | ---------- |
|     | 3.18  | 4.77  | 0.2         | 13   | 164   | 26.84      | 0.05 | 31.1       |
|     | 8     | 8     | 0.4         | 13   | 26    | 10.67      | 0.03 | 43.8       |
|     | 8     | 8     | 0.5         | 13   | 26    | 11.44      | 0.05 | 30.0       |
|     | 8     | 8     | 0.6         | 13   | 26    | 12.19      | 0.07 | 22.2       |
|     | 8     | 8     | 0.4         | 20   | 40    | 12.38      | 0.05 | 33.0       |
|     | 8     | 8     | 0.5         | 20   | 40    | 13.55      | 0.08 | 23.1       |
|     | 8     | 8     | 0.6         | 20   | 40    | 14.72      | 0.11 | 17.4       |
|     | 8     | 8     | 0.2         | 30   | 60    | 11.20      | 0.02 | 79.7       |
|     | 8     | 8     | 0.5         | 30   | 60    | 16.58      | 0.12 | 18.9       |
|     | 8     | 8     | 0.2         | 70   | 139   | 16.14      | 0.04 | 49.2       |
|     | 8     | 8     | 0.4         | 100  | 199   | 31.88      | 0.25 | 17.0       |
|     | 8     | 12    | 0.2         | 70   | 139   | 15.34      | 0.04 | 52.6       |
|     | 8     | 12    | 0.5         | 70   | 139   | 28.09      | 0.27 | 15.4       |
|     | 8     | 12    | 0.4         | 100  | 199   | 31.25      | 0.25 | 18.7       |
|     | 10    | 10    | 0.3         | 50   | 64    | 11.91      | 0.04 | 44.1       |
|     | 10    | 10    | 0.5         | 50   | 64    | 15.75      | 0.12 | 21.0       |
|     | 10    | 10    | 0.5         | 100  | 127   | 25.50      | 0.25 | 17.0       |
|     | 10    | 8     | 0.3         | 50   | 64    | 12.39      | 0.05 | 42.4       |
|     | 10    | 10    | 0.3         | 50   | 64    | 11.91      | 0.04 | 44.1       |
|     | 15.5  | 15.5  | 0.5         | 100  | 53    | 12.06      | 0.10 | 29.9       |
|     | 15.5  | 15.5  | 0.9         | 50   | 26    | 11.15      | 0.17 | 17.1       |
|     | 15    | 15    | 0.16        | 2000 | 1132  | 60.59      | 0.23 | 66.6       |
| (a) | 10    | 10    | 2.3         | 7    | 9*    | 6.14*      | 0.37 | 2.8*       |
| (b) | 10    | 10    | 1.0         | 5    | 6*    | 6.10*      | 0.05 | 20.3       |
| (c) | 3.18  | 4.77  | 0.56 (0.68) | 6    | 76    | 32.23      | 0.19 | 10.1*      |
| (d) | 15.5  | 15.5  | 5.28 (6.12) | 4    | 2*    | 7.14*      | 0.46* | 4.1*      |

A further disadvantage of a single passage is that, if it has a large enough cross-section that a sufficient increase in GSA is achieved, the aspect ratio of the passages will be relatively low unless the aspect ratio of the unit itself is such that the unit will be liable to breakage. It is desirable that the aspect ratio, ie $L/d_e$, of the passage is at least 6, particularly at least 8, but preferably not more than 40.

The units of the invention may be made by extrusion of a suitable composition through a die having cores producing the desired passages. Where the units are to be made of a ceramic material, as is often desired where the unts are to be employed as catalysts, adsorbents, or supports therefor, the units may be made by the process of our EP-A-134138. It is important when extruding such units having a multiplicity of relatively fine holes that, when the extrudate is cut into the desired lengths, the cutting process does not result in any significant distortion of the unit which would tend to obstruct the passages. A suitable cutting technique is described in our EP-A-223445. Alternatively the units may be made by pelleting or tabletting techniques. In this case the walls of the pelleting die and/or the cores may have a slight taper, for example of up to 3°, to assist in release of the units from the die. It will be appreciated that in such cases the units and/or the passages therein will not have a completely uniform cross section. Pelleting or tabletting techniques are less suitable than an extrusion method when the units are to be made in large numbers and/or have a large number of through passages. To avoid the risk of adjacent units packing so that one unit blocks the ends of the passages through an adjacent unit, the ends of the units are preferably non-planar, e.g. roughened, convex, or provided with at least one projecting member.

Particularly suitable materials from which the units may be made include alumina, silica, titania, zinc oxide, zirconia, magnesia, chromia, yttria, rare earth oxides, actinide oxides; solid solutions thereof (e.g. stabilised zirconia); multiphase combinations of oxides (e.g. partially stabilised zirconia, transformation toughened alumina); compound oxides such as magnesia alumina spinel, aluminium titanate, mullite, magnesium aluminium titanate, calcium aluminate, barium titanate, cordierite, and zeolites; and zinc carbonate. Also suitable are non-oxidic materials such as carbon, e.g. activated carbon, silicon carbide, sialon, silicon nitride, and multiphase combinations, or the precursors thereof. In some cases combinations of oxidic and non-oxidic materials may be employed, e.g. silica and carbon to produce silicon carbide after sintering or mixtures of activated carbon and bentonite. Oxidic materials that are of use as catalyst precursors or as catalysts per se include magnetite, haematite, nickel oxide, copper oxide, cobalt oxide, and cobalt molybdate. Where the oxidic material forming the major proportion of the extrudable composition is itself a catalytic material or precursor thereto, the extrudable composition will often contain one or more other oxidic materials, such as the above mentioned oxides or a rare earth, to act as a stabiliser to minimise sintering of the catalytic material during use.

To provide an extrudable consistency the composition usually contains a liquid and a viscosity-modifying polymer soluble or swellable in the liquid. If the liquid is water, which is preferred, the polymer can comprise for example, a soluble carbohydrate such as starch, alginate or xanthan gum; a cellulose ether; a protein; a polyvinyl alcohol, ester, acetal, ether, or mixed derivative eg a partially hydrolysed polyvinyl acetate; a polyalkylene oxide; a polyacrylate or methacrylate; or polyacrylamide or polymethacrylamide. Polymer mixtures may be employed. If the liquid is organic, for example a polyol such as glycol or glycerol, numerous organic polymers are suitable, for example polyolefins of high molecular weight (over 150000) with a plasticiser such as a polyol or high boiling ester as the liquid.

Particularly suitable compositions are disclosed in our EP-A-134138. As a further alternative, the extrudable consistency can be due to a water-swellable inorganic compound oxide, for example a clay mineral such as bentonite or colloidal magnesium aluminium silicate sold under the trade name Vee Gum T.

In an important class of extrudable compositions, the oxidic material is a hydraulic cement. Suitable hydraulic cement compositions are described in our EP-A-55035.

After shaping, and, where the shaping process is by extrusion, preferably after cutting the extrudate to the desired length, the shaped product is dried, if necessary, and then, where a binder having an organic component is employed in the shaping step, the organic component is burnt out in a calcination step, preferably at 250°–500° C., in an oxygen containing gas, e.g. air. Such a calcination step may also be advantageous even where no organic binder is employed. The shaped product may then be sintered to effect densification and increase its strength.

Like fused products, sintered products have a low surface area and a high density. However sintered a products can readily be distinguished from fused products by optical and/or scanning electron microscopy since sintered products have a morphology that is quite different from that of fused products. In particular the sintered units show a significant proportion of vestiges of the finely divided particles used to make the units, although many of the fine particles will have agglomerated.

The units of the invention are of particular utility where a large geometric surface area per unit volume of a random packed bed of the packing units is required—as in the case where the units have a low porosity and/or the reaction and/or adsorption takes place essentially at the geometric surface of the packing units. They are also of utility where reaction takes place throughout the bulk of the unit but diffusion of the fluid brought into contact with the packing units limits the reaction rate: the provision of the passages enables the fluid to diffuse into the bulk of the packing material more rapidly since the maximum distance of any part of the packing material from its geometric surface is relatively small, generally less than 1 mm.

It is preferred that the units and the passages therein are dimensioned so that at least 1%, preferably at least 3%, by volume of the reactants pass through the units whereas the remainder passes over the external surface of the units. While the flow of the reactants over the external surface will generally be turbulent, normally the flow through the unit passages will be laminar.

Preferred units are in the form of cylinders having a diameter of 5 to 15 mm, an aspect ratio of 0.8 to 1.2, and having at least 10 passages extending longitudinally therethrough, each passage having a circular cross-section of diameter less than 0.7 mm. Typically there may be 13 to 50 or more passages of diameter 0.4 to 0.6 mm.

The passages are preferably disposed in a substantially regular array with a mean spacing between the centres of adjacent passages of, preferably, at least 1.5d and with the mean spacing between the centres of the passages and the exterior surface of the unit preferably at least d.

In a bed the units can be oriented in random fashion or packed regularly. In the random orientation, in a small proportion of units, ie those oriented with their longitudinal axes near perpendicular to the direction of flow of the gaseous reactants, there will only be a small pressure difference between the ends of the unit and so there will only be a little flow of the gaseous reactants through the passages of those units. However the mean flow through the passages of all the units will be about one half of the maximum flow found in those units where the flow direction through the passages coincides with the direaction of maximum pressure gradient.

Units in accordance with the invention are also of use in beds wherein they are stacked in a regular array. In this way the empty space within the bed can be reduced. This is of particular merit in applications such as pressure swing adsorbent beds e.g. using units made of active carbon or a zeolite or beds of an absorbent material such as are commonly employed for desulphurisation. Where the units are stacked side by side, e.g. in layers, the cross-sectional configuration of the units is advantageously that of a polygon, preferably regular, such as a square, rectangle, triangle, or hexagon. Units of other polygonal cross section, e.g. octagonal, can be used and may have units of differing cross section, e.g. square or triangular, also incorporated into the stacked array. In such a stacked bed, the through passages will generally be oriented so that they are substantially parallel to the direction of fluid flow through the bed. Also, in such a stacked bed, provision should be made, e.g. by providing the units with domed or roughened ends, to prevent units of one layer blocking access to the passages in an adjacent layer.

Where the units are to be employed in a random packed bed, the aspect ratio of the units, i.e. the ratio L/D is preferably below 2 and the voidage GV is preferably below 0.35.

Where however the units are stacked, e.g. where they have a polygonal, for example hexagonal, cross-sectional configuration, the aspect ratio of the units can be greater than 2, e.g. up to 3 or more, and the voidage, GV, may be larger, up to 0.40.

A further benefit of the multiholed units is that, in catalytic reactions such as ammonia synthesis, each passage through which gas flows acts in a manner akin to a catalyst bed in a quench cooled reactor. Thus gas entering a passage undergoes reaction as it passes along the passage and then emerges from the passage whereupon it is quenched by gas that has flowed has flowed past the unit, ie through the space between adjacent units. Within each passage essentially adiabatic conditions exist so that a temperature gradient, from the passage inlet towards the outlet, as a result of the reaction, is liable to occur. By this means more rapid reaction may be achieved.

Also the reactants mixture flowing through the unit passages contacts, proportionately, a greater geometric surface area of the unit material than the reactants mixture flowing past the exterior surface of the unit, and so the equilibrium product concentration is liable to be approached more closely by the reactant mixture flowing through the passages than by that flowing past the exterior surface of the unit. Although the fluid flowing through the passages will approach the equilibrium product concentration to a greater extent than that flowing past the external surface of the units, the difference between the reaction driving force, viz the difference between the product equilibrium concentration and the actual product concentration, in the fluid emerging from the passages and that of the fluid that has flowed past the external surface of the unit, will generally be relatively small for most practical systems, provided that a suitable size and number of passages are chosen. Over the whole bed, this results in a more rapid, and/or complete, approach to equilibrium, and so, in some cases, the bed volume can be reduced and/or a higher product concentration can be achieved. Alternatively, or additionally, the flow rate of the reactants through the bed can be reduced, thereby enabling the pressure drop across the bed to decrease. Where, as is customary in, for example ammonia synthesis, unreacted reaction mixture is recycled after separation of the product therefrom, this enables the power required to effect such circulation to be reduced. Previous proposals for multihole units did not have a sufficiently large number of small passages combined with a sufficiently low voidage to make the above advantages of the multihole shapes significant.

The net result is that catalyst beds made of random packed units having multiple longitudinal through passages show a significant increase in activity, compared to catalyst beds of units of similar size but having no through passages, without any significant increase in pressure drop across the catalyst bed.

The provision of the multiple passages through each unit also has the effect of reducing the resistance of a random packed bed of the units of the flow of fluid therethrough so that the pressure difference between the bed inlet and outlet is decreased. If the pressure difference that can be tolerated is about the same as in a bed of units having no through passages, this means that it is also possible to reduce the external dimensions, i.e. L and/or D, of the units slightly in relation to the corresponding external dimensions required when there are no through passages. Since decreasing the external dimensions of the units has the effect of increasing GSA/V, an even greater GSA/V can be achieved with no significant change in the pressure difference across the bed.

The particular utility of the invention can be illustrated by reference to iron catalyst precursors, e.g. ammonia synthesis catalyst precursors, which may be made by sintering extruded units extruded from a finely divided iron oxide, preferably haematite, composition.

The units preferably contain at least 50% by weight of iron in the form of iron oxide. However a proportion of the iron atoms, for example up to 20%, by number of atoms, may be replaced by cobalt atoms.

For use as a catalyst precursor the units will usually contain one or more oxidic promotor materials in addition to iron oxide. Typical promotor materials are lime, magnesia, alumina and/or potassium oxide. Other promotors, such as oxides of rubidium, cesium, beryllium, lanthanides, actinides, molybdenum, vanadium or tungsten, metals such as platinum group metals and minor constituents such as silica, may be present instead of, or in addition to, the above promotors. The nature and proportion of the promotors will depend on the intended use of the catalyst. Thus, for ammonia synthesis, the units will normally contain alumina and an alkali metal oxide and, optionally, magnesia and/or lime. Typically the proportions of such promotors in the units are as follows:

| | |
|---|---|
| alumina | 1–5% w/w |
| alkali metal oxide | 0.3–2% w/w |
| lime | 0–5% w/w |
| magnesia | 0–2% w/w |

For use as a nitrile hydrogenation catalyst precursor, the unit will normally contain up to 5%, eg 0.5–5% w/w, of alumina or magnesia but will not normally contain an alkali metal oxide.

One disadvantage of the incorporation of lime as a flux to aid densification in the compositions used to make sintered iron oxide units is that, on reduction of the iron oxide to metal, there is a tendency of the unit to crack and disintegrate. We have found that by the incorporation of small amounts of magnesium aluminate spinel into the composition from which the sintered unit is made, the tendency to cracking upon reduction of the iron oxide is markedly decreased. The amount of magnesium aluminate spinel that is employed is preferably 0.1 to 1 mole per mole of lime. In order to suppress crack formation, addition of the magnesium aluminate spinel as such is necessary: addition of magnesia and alumina as separate components does not have the desired effect.

The sintering of units made from a finely divided iron oxide composition is preferably effected in an inert, dry atmosphere, e.g. nitrogen, at a temperature of above 1100° C., preferably above 1200° C., and particularly at least 1300° C. Preferably the sintering temperature is below 1450° C.

Although the iron oxide composition used to make the units may be magnetite, this is less preferred. However when using haematite, whose compositions are more easily shaped, it is desirable to reduce the haematite to magnetite before or during the sintering step. A preferred method of effecting this reduction is by the incorporation of graphite weight of the haematite used.

Instead of effecting the reduction of haematite with graphite, the reduction may be effected with iron by including finely divided iron powder, typically in an amount of 8 to 9% by weight of the haematite in the particulate iron oxide composition.

Such a reduction step should be conducted at above 450° C. in an inert atmosphere. Hence, where a calcination step is employed to burn out any organic materials prior to reduction of the haematite, the calcination should be conducted at a temperature below 450° C.

The density of a bed of standard ammonia synthesis catalyst precursor made by fragmenting a fused iron oxide composition is typically about 2.5 to 2.8 g.cm$^{-3}$.

With the units of the invention the bed density is the product of the unit density, the parameter 1−GV, (i.e. the ratio of the actual volume of the unit of the volume, V, of the cylinder of length L and diameter D), and the proportion, y, of the bed volume actually taken up by the units.

Since, for a random packed bed of cylindrical units of aspect ratio 1, y is about 0.7 (assuming that the bed has a large cross-sectional dimensions in relation to the external dimensions of the units) and the density of units of sintered iron oxide is generally above 4 g.cm$^{-3}$, if the voidage of the units is below about 20%, the bed density will normally be above about 2.2 g.cm$^{-3}$. In some cases bed densities above those of standard fragmented, fused, catalyst precursor can be realised: for example with cylindrical units of L=D=8 mm having a density of 4.6 g.cm$^{-3}$, typical values of the bed density are as follows

| n | d (mm) | bed density g · cm$^{-3}$ | GSA/V (cm$^{-1}$) | GSA/A · GV |
|---|---|---|---|---|
| 13 | 0.64 | 2.95 | 12.5 | 20.0 |
| 20 | 0.5 | 2.96 | 13.6 | 23.1 |
| 20 | 0.64 | 2.80 | 15.2 | 15.8 |
| 30 | 0.4 | 2.98 | 14.8 | 26.3 |

In some cases it may be desirable, to increase the bed density, to employ as a catalyst bed a mixture of shaped units of two or more distinct sizes and/or shapes.

The invention is also of particular utility for absorbent beds such as desulphurisation materials, e.g. zinc and/or copper oxides where diffusion of the sulphur-bearing material, e.g. a gas or liquid, into the absorbent is rate limiting; beds where the passages may be dimensioned such that gas phase materials can pass through the passages in preference to liquids (which pass mainly over the external surface of the units); absorbents such as carbon or zeolites, e.g. for pressure swing adsorption, where rapid diffusion of a fluid into and out of the packing is desirable; and for fuel cells.

For many applications it may be desirable to provide the passages with a coating: this may be a material that is catalytically active (or is convertible, e.g. by heat and/or reduction, to a catalytically active material), or that acts as a membrane or filter. Depending on the intended application and desired thickness of the coating it may be applied by dipping/impregnation techniques or by vapour deposition or a sol-gel technique.

The invention is illustrated by the following examples:

EXAMPLE 1

An ammonia synthesis catalyst precursor was made by extrusion of a paste by the process of EP-A-134138 in which the oxidic material of the paste comprised a very finely divided mixture (median particle size 3 $\mu$m, all the particles having a size below 10 $\mu$m) of haematite, alumina trihydrate, and calcium carbonate, and also containing potassium carbonate, into an extrudate of cylindrical configuration. The extrudate was cut into lengths, dried, calcined at 400° C., and sintered at 1300° C.

In one extrusion the die had no cores so as to produce extrudates having no through passages while in another extrusion the die was provided with 13 suspended wire cores disposed in a regular array to provide an extrudate having 13 through passages. The die and cores were dimensioned such that, after sintering, the extrudates had a length and external diameter of 6.5 mm and, in the case of the extrudate having through passages, through passages of diameter 0.6 mm. The units with through passages had a GSA/V value of 16.3 cm$^{-1}$, a voidage GV of 0.11, a value of GSA/(A·GV) of 15.9 and a particle density as determined by reference to their volume in mercury at atmospheric pressure, of 4.2 g.cm$^{-3}$, and a porosity of 0.043 cm$^3$.g$^{-1}$.

Chemical analysis showed the sintered units to have the following composition, expressed as percentages by weight:

| | |
|---|---|
| Fe$_2$O$_3$ | 96.9% |
| CaO | 0.6% |
| Al$_2$O$_3$ | 2.0% |
| K$_2$O | 0.5% |

12 (approx 10 g) units were mixed with 65 g of fused alumina chips of mean particle size 2.4 to 3.35 and mm and charged to a reactor to form a diluted bed 90 mm long and 28 mm diameter. The sintered units were then activated by gradually heating to 475° C. over a period of 8 hours and holding at that temperature for 6 hours, under an absolute pressure of 150 bar of a 3:1 mixture of hydrogen:nitrogen. The space velocity during reduction was 25000 cm$^3 \cdot$g$^{-1} \cdot$h$^{-1}$.

The activity of the catalyst for the ammonia synthesis reaction was then assessed by measuring the concentration of ammonia in the gas leaving the reactor at a variety of space velocities. The reaction conditions were 450° C., 150 bar absolute pressure and with 3:1 hydrogen:nitrogen.

The results are shown in the following table.

| Sample | NH$_3$ concentration % v/v) at space velocity V cm$^3 \cdot$g$^{-1} \cdot$h$^{-1}$ | | |
|---|---|---|---|
|  | V = 10,000 | V = 15,000 | V = 20,000 |
| No through passages | 9.55 | 7.75 | 6.60 |
| 13 through passages | 10.05 | 8.70 | 7.45 |

EXAMPLE 2

Sintered units were made by the procedure of Example 1 but with the incorporation of various proportions of magnesium aluminate spinel, that had been ground to a similar fineness as the haematite, to the haematite/alumina/calcium carbonate mixture. In order to assess the reduction characteristics of the sintered units a number of the units were charged to a cylindrical reactor of 27.5 mm diameter and 70 mm length to form a randomly packed bed of volume about 40 cm$^{-3}$.

In a first set of experiments, A, while passing a mixture of hydrogen and nitrogen containing 75% v/v of hydrogen through the bed at a rate of 250 liters. h$^{-1}$, the temperature of the bed was increased to 350° C. over a period of 3 hours and then further increased to 475° C. over a period of 8 hours.

In a second set of experiments, B, the bed was heated to 475° C. while passing nitrogen through the bed at a rate of 250 liters. h$^{-1}$ and then the nitrogen stream was replaced by the hydrogen/nitrogen mixture containing 75% v/v hydrogen and maintained at that temperature until the iron oxide was fully reduced to iron.

In both sets of experiments, after cooling to room temperature under the hydrogen/nitrogen mixture, the hydrogen/nitrogen mixture was replaced with nitrogen flowing at a rate of 200 liters/h and then, over a period of 30 minutes, the nitrogen was gradually replaced by air. The units were then examined. The results are shown in the following table.

By way of comparison compositions were also made in which the magnesium aluminate spinel was replaced by magnesia.

| Composition Additive % w/w* | Reduction procedure | Comments |
|---|---|---|
| none — | A | Fragmented, partially pulverised |
| spinel 0.25 | A | Intact, slightly dusty |
| spinel 0.5 | A | Intact, slightly dusty |
| spinel 0.75 | A | Intact, slightly dusty |
| spinel 1.0 | A | Intact, slightly dusty |
| spinel 1.0 | B | Little fragmentation and dust |
| magnesia 1.0 | B | Fragmented, little dust |

*percent by weight of the haematite/alumina/lime mixture.

When the reduction procedure A was performed on units made from a composition from which the lime had been omitted, the units were intact.

EXAMPLE 3

Extrudates were made by the procedure of example 1 but using a composition also containing 1% by weight of magnesium aluminate. In this case the die with the wire cores had 50 cores arranged in three concentric rings of 29, 14, and 6, around a central core. The die and cores were dimensioned such that, after sintering, the extruded units had a length and diameter of 8.5 mm and, in the case of the units with through passages, passages of about 0.48 mm diameter. The particle density was 4.0 g.cm$^{-3}$ and the units with through passages had a voidage of 0.16, a GSA of about 20 cm$^{-1}$, and a value of GSA/(A·GV) of 17.7. There were 88 holes per cm$^2$ of unit cross section.

The chemical composition, by weight, of the units was as follows:

| | |
|---|---|
| Fe$_3$O$_3$ | 96.4% |
| Al$_2$O$_3$ | 2.3% |
| CaO | 0.6% |
| MgO | 0.3% |
| K$_2$O | 0.4% |

An adiabatic reactor was used to assess the activity of each type of catalyst. The bed volume was 23.7 liters filling an annular space of outer diameter 203 mm and inner diameter 8 mm and length 1015 mm. The precursors were reduced at 80 bar pressure with a gas mixture containing hydrogen and nitrogen in the molar ratio of 2.35 at a flow rate of 300 m$^3 \cdot$h$^{-1}$ (at STP). The gas inlet temperature was initially 350° C. and was increased to maintain the water concentration below 2000 ppm by volume. When reduction was complete, the inlet temperature was reduced to 350° C. and, after steady state conditions had been established, the ammonia concentration of the gas leaving the bed was measured together with the increase in temperature across the bed. The results were as shown in the following table.

| | Ammonia concentration (% v/v) | Temperature increase (°C.) |
|---|---|---|
| no passages | 6.6 | 71 |
| 50 passages | 8.3 | 95 |

These examples show the efficiency of the through passages in increasing the catalyst activity.

The effect of the increase in catalytic activity by the use of the 50 hole catalyst on the efficiency of an ammonia plant is illustrated by the following calculated example.

A typical design flowsheet producing about 1000 te/day of ammonia employing a standard fused catalyst of 6–9 mm particle size uses a synthesis loop operating at about 131 bar abs and a circulation rate of about 26000 kg·mol/h. In such a flowsheet the power required for synthesis gas compression and circulation and for refrigeration to recover the ammonia product is typically about 18.6 MW and the heat recoverable from the synthesis is about 30.4 MW. The recovered heat is generally employed to provide that power requirement and to provide at least some of the power and/or heat required in the procution of the synthesis gas and, possibly to provide power for export.

Because of its increased activity, when using the mutli-hole catalyst in place of the standard fused catalyst, the circulation rate required to produce the same amount of product ammonia can be reduced to about 22000 kg·mol/h thus reducing the loop pressure to about 116 bar abs. As a result the synthesis gas compression and circulation, and refrigeration power requirement is reduced to about 16.9 MW and the heat recoverable is increased to about 30.9 MW. By modifying the circulator to permit the rate of circulation to be reduced to about 21000 kg·mol/h but at the same time giving a loop pressure of 121.5 bar abs, an even more efficient process can be obtained since the synthesis gas compression and circulation, and refrigeration power requirement is only about 16.1 MW while the heat recoverable is increased to about 31.1 MW.

We claim:

1. A bed packing material in the form of units, each unit having
   (a) a multiplicity of passages of substantially uniform cross section extending lengthwise through the unit, said passages having an effective diameter of 0.03 to 1 mm, where the effective diameter is four times the cross-sectional area of the passage divided by the perimeter of the passage cross section, and there being at least 20 passages per cm$^2$ of the unit cross section area;
   (b) a substantially uniform cross section;
   (c) a ratio of the length, L, to the notional cross section diameter, D, of at least 0.5, said notional cross section diameter being the diameter of the circle of area equal to the cross-sectional area the unit would have if there were no passages therethrough, the minimum of said length and notional cross section diameter being at least 3 mm;
   the number of said passages, and their size relative to said length, L, and notional cross section diameter, D, being such that each unit has
   (i) a geometric voidage, GV, of not more then 0.40;
   (ii) a ratio of the geometric surface area, GSA, to the volume, V, of the cylinder of length L and diameter D, of at least 10 cm$^{-1}$; and
   (iii) a ratio of GSA to the product of GV and A of at least 15, where A is the surface area of the cylinder of length L and diameter D.

2. A bed packing material according to claim 1 wherein the length, L, and notional cross section diameter, D, of each unit are both in the range 6 to 15 mm.

3. A bed packing material according to claim 1 wherein the effective diameter of each of the passages is in the range 0.2 to 0.5 mm.

4. A bed packing material according to claim 1 wherein there are 25 to 2000 passages per cm$^2$ of unit cross section area.

5. A bed packing material according to claim 1 wherein the ratio of the geometric surface area, GSA, to the volume, V, of the cylinder of length L and diameter D, is at least 20 cm$^{-1}$.

6. A bed packing material according to claim 1 wherein the ratio of GSA to the product of GV and A is at least 20.

7. A bed packing material according to claim 1 wherein the units are in the form of cylinders having a diameter of 5 to 15 mm, an aspect ratio of 0.8 to 1.2, and having at least 10 passages extending longitudinally therethrough, each passage having a circular cross section of diameter less than 0.7 mm.

8. A bed packing material according to claim 1 wherein the aspect ratio of the passages, defined as the ratio of the length, L, to the effective diameter of the passages, is in the range 6 to 40.

9. A bed packing material according to claim 1 suitable for use as an ammonia synthesis catalyst precursor wherein the units comprise a sintered iron oxide composition and have a particle density of at least 4.0 g·cm$^{-3}$.

10. A random packed bed of a bed packing material according to claim 1 wherein each unit has
   (a) a ratio of the length, L, to the notional cross section diameter, D, in the range 0.5 to 2, and
   (b) a geometric voidage, GV, of not more than 0.35.

* * * * *